(12) United States Patent
Kunichi et al.

(10) Patent No.: US 8,056,859 B2
(45) Date of Patent: Nov. 15, 2011

(54) AIRPLANE WING STRUCTURE

(75) Inventors: Takahiro Kunichi, Saitama (JP); Tsugio Saito, Saitama (JP); Ken Ohizumi, Saitama (JP); Hiroshi Kato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 671 days.

(21) Appl. No.: 12/368,397

(22) Filed: Feb. 10, 2009

(65) Prior Publication Data
US 2009/0314892 A1 Dec. 24, 2009

(30) Foreign Application Priority Data

Feb. 14, 2008 (JP) ................................. 2008-033610

(51) Int. Cl.
*B64C 1/06* (2006.01)
(52) U.S. Cl. .................. 244/123.1; 244/123.8
(58) Field of Classification Search ............... 244/123.1, 244/123.4, 123.8, 123.9, 124
See application file for complete search history.

(56) References Cited

U.S. PATENT DOCUMENTS

| 2,483,134 | A | * | 9/1949 | Gitz et al. ................. 244/123.8 |
| 7,740,202 | B2 | * | 6/2010 | Namaizawa et al. ...... 244/123.1 |
| 2004/0056152 | A1 | * | 3/2004 | Yamashita et al. ............ 244/123 |

FOREIGN PATENT DOCUMENTS

| JP | 2000-506816 A | 6/2000 |
| JP | 2002-302097 A | 10/2002 |

* cited by examiner

*Primary Examiner* — Joshua Michener
(74) *Attorney, Agent, or Firm* — Birch, Stewart, Kolasch & Birch, LLP

(57) ABSTRACT

A rib of an airplane wing is prevented from deforming due to a machining load when machining a rivet hole in parts where the rib and a skin are joined. With regard to a rib that provides a connection between first and second spars of the airplane wing, the rib is formed with mounting flanges secured to a skin via a rivet, a stringer through hole for a stringer to be positioned through, and first and second cutouts facing parts where the first and second spars and the skin are connected. Since reinforcing beads are formed along the mounting flanges and reinforcing flanges are formed so as to extend in the span direction from the edges of the stringer through hole and the first and second cutouts and be connected integrally to the mounting flanges, the stiffness of the rib toward a load in the vertical direction when drilling a rivet hole can be enhanced.

20 Claims, 6 Drawing Sheets

CONVENTIONAL EXAMPLE

AIRPLANE WING STRUCTURE

BACKGROUND OF THE INVENTION

1. Field of the Invention

The present invention relates to an airplane wing structure having first and second spars extending in the span direction; a plurality of stringers disposed between the first and second spars and extending in the span direction; a rib extending in the chord direction and providing a connection between the first and second spars; and a skin covering the first and second spars, the stringer, and an upper face and a lower face of the rib.

2. Description of the Related Art

An airplane wing structure is disclosed in Japanese Patent Application Laid-open No. 2002-302097 or Published Japanese Translation (PCT) No. 2000-506816.

In general, a rib for defining the airfoil of an airplane wing is formed by press forming a thin plate material in order to lighten the weight. In addition, a stringer through hole is formed in an upper edge and a lower edge of the rib with a stringer fixed to an inner face of a skin of the wing and positioned through the stringer through hole via a gap. The wing is formed as a box structure that is resistant to bending or twisting by joining a spar, the stringer, the rib, and the skin, but when lift or drag acts on the wing, there is a possibility that the rib, which is formed from a thin plate material, will buckle due to the shear load. In the arrangements disclosed in Japanese Patent Application Laid-open No. 2002-302097 and Published Japanese Translation (PCT) No. 2000-506816, when press forming the rib, a bead extending in the vertical direction (wing thickness direction) is formed integrally with the rib, thereby enhancing the buckling strength of the rib toward a shear load.

SUMMARY OF THE INVENTION

In an embodiment of the present invention, a rib and a skin are joined by superimposing the skin on a mounting flange formed by bending over a peripheral part of the rib and, in a state in which they are positioned, machining a rivet hole in the skin and the mounting flange with a drill and crimping a rivet inserted into the rivet hole.

However, when drilling a rivet hole while positioning by superimposing a skin S on a mounting flange F of a rib R, the entire rib R might be curved due to the drilling load as shown in FIG. 6A, or the mounting flange F of the rib R might be curved due to the drilling load as shown in FIG. 6B. In addition, problems exist with respect to the rivet hole not being formed as a true circle, thus degrading the machining precision, or the rib R deforms, thus requiring a repair operation.

It is an object of an embodiment of the present invention, to prevent a rib of an airplane wing from deforming due to a machining load when machining a rivet hole in the parts where the rib and a skin are joined.

In order to achieve the object, according to an embodiment of the present invention, there is provided an airplane wing structure having first and second spars extending in the span direction; a stringer disposed between the first and second spars and extending in the span direction; a rib extending in the chord direction and providing a connection between the first and second spars; and a skin covering the first and second spars, the stringer, and an upper face and a lower face of the rib. A mounting flange is formed on at least one of an upper edge and a lower edge of the rib and being secured to the skin via a rivet. A stringer through hole is formed by cutting out the mounting flange with the stringer positioned through the stringer through hole. First and second cutouts are formed in the front end and the rear end of at least one of the upper edge and the lower edge of the rib and facing parts where the first and second spars and the skin are connected. The rib comprises a reinforcing bead formed along the mounting flange, and a reinforcing flange that extends in the span direction from edges of the stringer through hole and the first and second cutouts and is integrally connected to the mounting flange.

In accordance with the arrangement of an embodiment of the present invention, with regard to the rib that provides a connection between the first and second spars of the airplane wing, the rib includes the mounting flange secured to the skin via the rivet, the stringer through hole for a stringer to be positioned through, and the first and second cutouts facing the parts where the first and second spars and the skin are connected, since the reinforcing bead is formed along the mounting flange and the reinforcing flange is formed so as to extend in the span direction from the edges of the stringer through hole and the first and second cutouts and be connected integrally to the mounting flange, the stiffness of the rib toward a load in the vertical direction can be enhanced. When drilling a rivet hole with the skin superimposed on the mounting flange of the rib, not only is it possible to prevent the machining precision of the rivet hole from being degraded due to deformation of the rib or its flange by a machining load, but it is also possible to eliminate the need for a jig for preventing deformation of the rib and eliminate the necessity for an operation to repair a deformed rib, thus reducing the machining cost.

According to an embodiment of the present invention, the reinforcing bead comprises a main body portion and a bent portion that bends from an end part of the main body portion along the stringer through hole or the first or second cutout.

In accordance with the arrangement of this embodiment of the present invention, since the reinforcing bead of the rib is provided with the bent portion, which bends from the end part of the main body portion along the stringer through hole or the first and second cutouts, the effect of the reinforcing bead in reinforcing the rib can be further enhanced.

A main spar 13 of embodiments corresponds to the first spar of the present invention, a front spar 14 of the embodiments corresponds to the second spar of the present invention, an upper skin 19 and a lower skin 20 of the embodiments correspond to the skin of the present invention, a front rib 21 of the embodiments corresponds to the rib of the present invention, and first and second reinforcing beads 23A and 23B of the embodiments correspond to the reinforcing bead of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
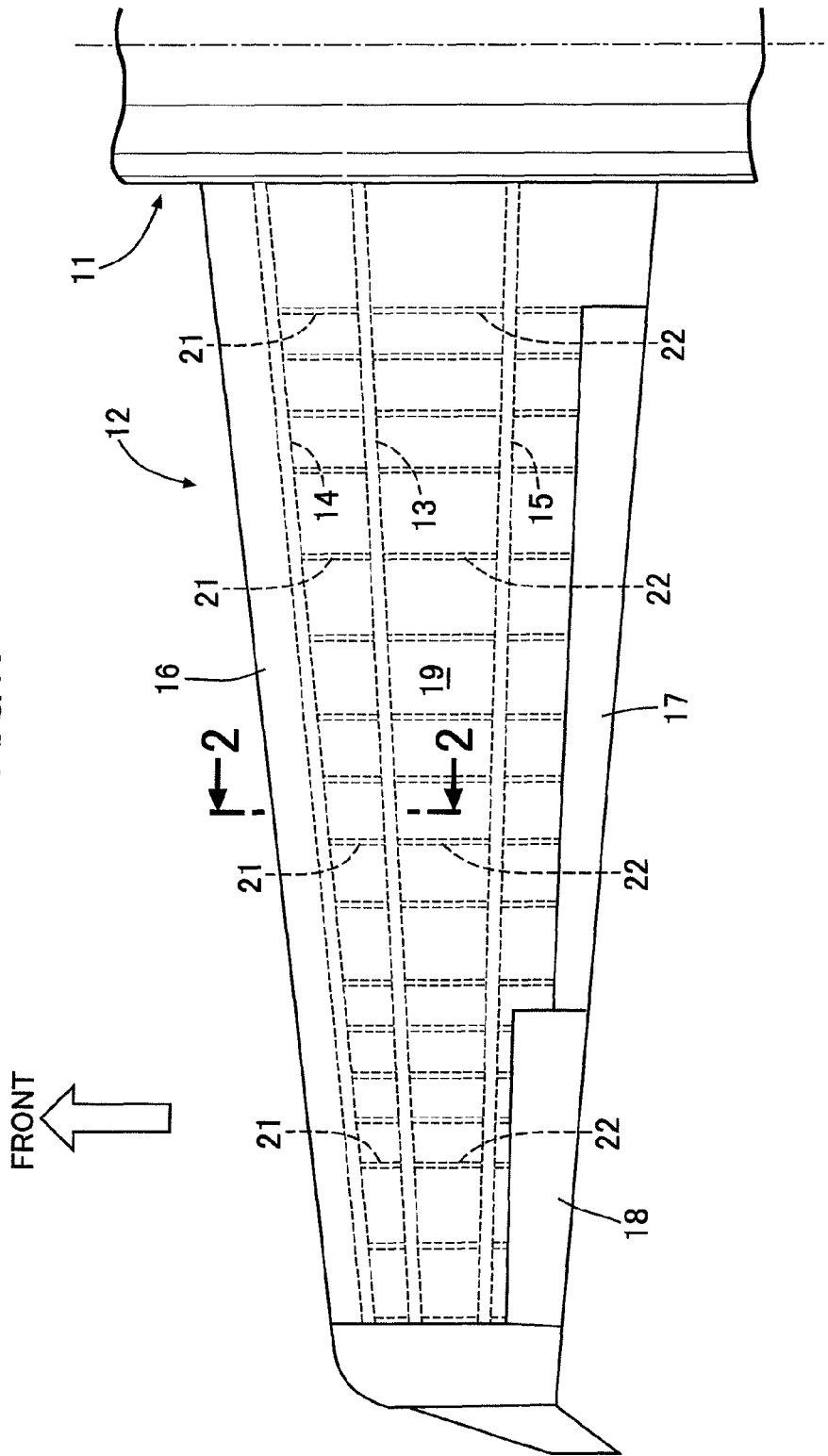
FIG. 1 is a top view of a left main wing of an airplane.
Figure 2:
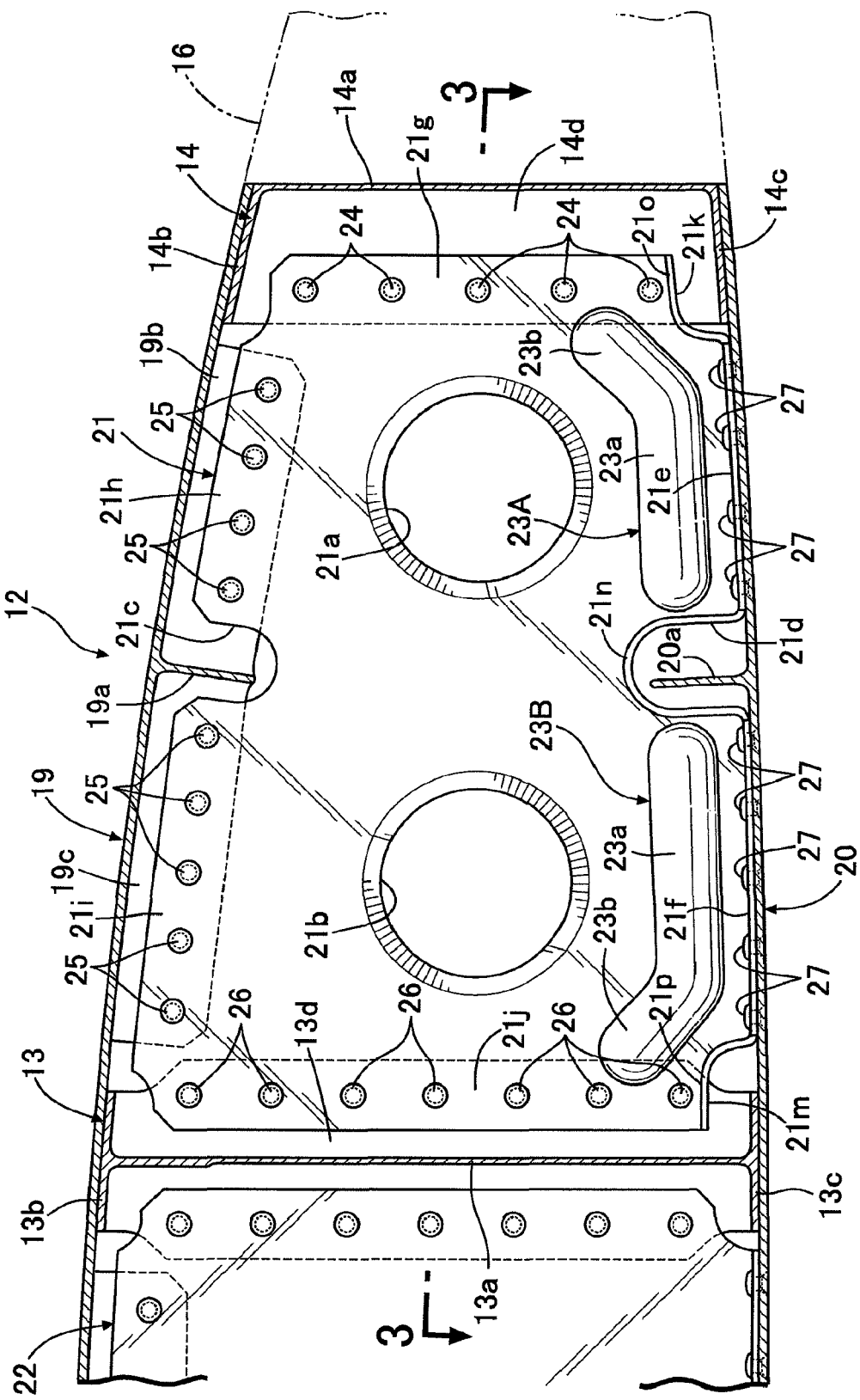
FIG. 2 is an enlarged sectional view along line 2-2 in FIG. 1.
Figure 3:
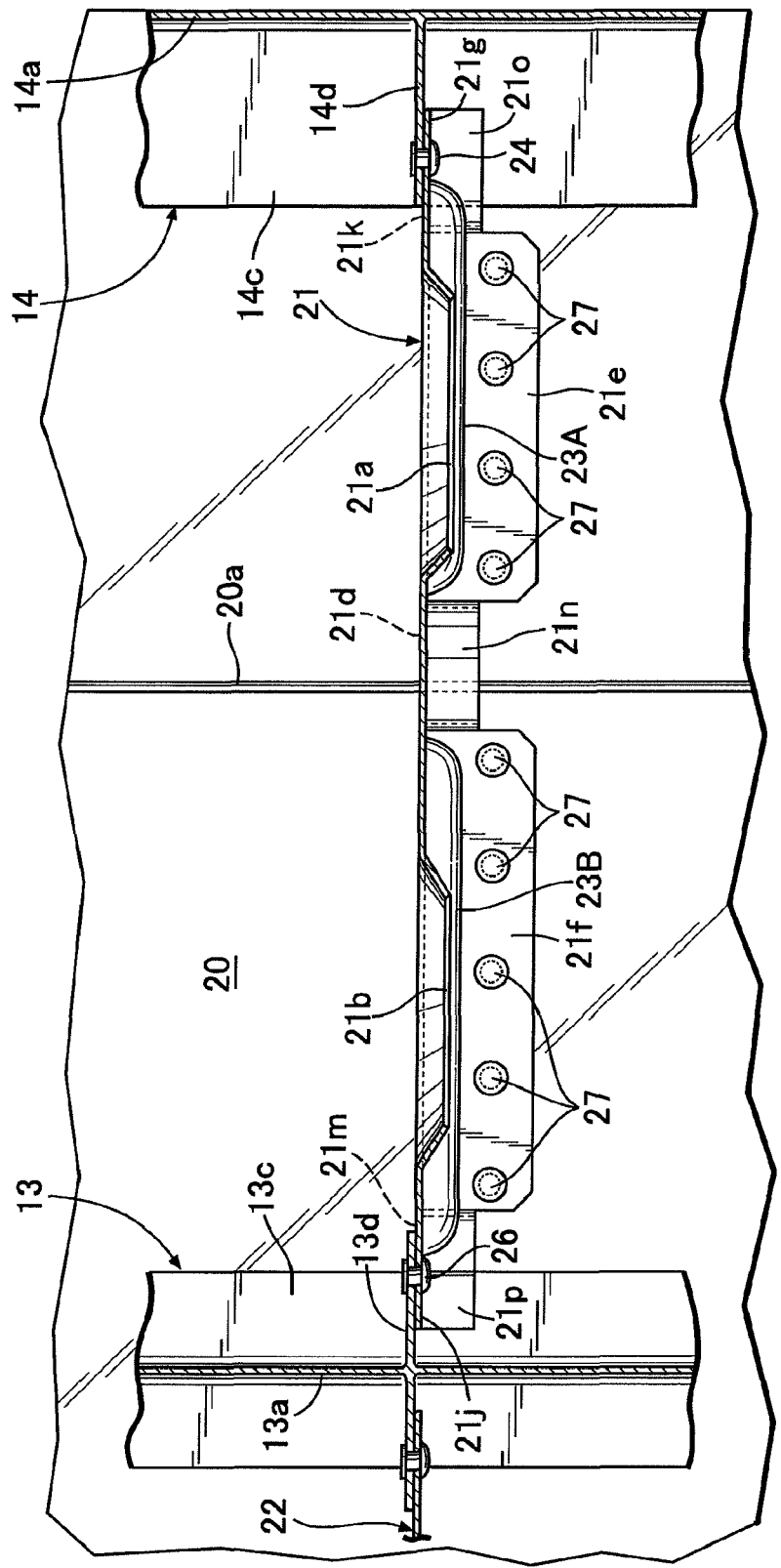
FIG. 3 is a sectional view along line 3-3 in FIG. 2.

As shown in FIG. 1 and FIG. 2, a main wing 12 supported on a fuselage 11 of an airplane includes a main spar 13 extending in substantially the span direction, a front spar 14 disposed in front of the main spar 13, and a rear spar 15 disposed to the rear of the main spar 13. A front edge member 16 is fixed to the front of the main spar 13, a flap 17 is swingably supported on the inside, in the span direction, of a rear edge part of the main wing 12, and an aileron 18 is swingably supported on the outside, in the span direction, of the flap 17.

An upper skin 19 defining an upper surface of the main wing 12 includes a plurality of stringers 19a integrally formed therewith along a lower face in the span direction, and a lower skin 20 defining a lower surface of the main wing includes a plurality of stringers 20a integrally formed therewith along an upper face in the span direction.

The main spar 13 is formed from an I-form cross-section member that includes a web 13a and a pair of upper and lower flanges 13b and 13c, and the front spar 14 is formed from a channel-form cross-section member that includes a web 14a and a pair of upper and lower flanges 14b and 14c. Although not illustrated, the rear spar 15 is also formed from an I-form cross-section member in the same manner as for the main spar 13.

The main spar 13 and the front spar 14 are connected via a plurality of front ribs 21 disposed in the chord direction, and the main spar 13 and the rear spar 15 are connected via a plurality of rear ribs 22 disposed in the chord direction. The front rib 21 and the rear rib 22 are members formed by press forming a metal plate, and have a shape that defines the airfoil of the main wing 12. Since the front rib 21 and the rear rib 22 have substantially the same structure with slightly different shapes, the structure of the front rib 21 is explained below as being representative thereof.

The front rib 21 is a substantially rectangular plate-shaped member having a slightly lower height on the front edge side, two weight-cutting holes 21a and 21b are formed in its front and rear parts for the purpose of lightening the weight, and first and second reinforcing beads 23A and 23B extending in the fore-and-aft direction are integrally press-formed beneath the two weight-cutting holes 21a and 21b. The first reinforcing bead 23A on the front side includes a bent portion 23b that bends upward and forward from the front end of a main body portion 23a extending in the fore-and-aft direction, and the second reinforcing bead 23B on the rear side includes a bent portion 23b that bends upward and rearward from the rear end of a main body portion 23a extending in the fore-and-aft direction. These first and second reinforcing beads 23A and 23B are formed integrally when the front rib 21 is press formed.

Furthermore, a stringer through hole 21c, through which the stringer 19a formed on the lower face of the upper skin 19 is positioned, is formed in a central part of the upper edge of the front rib 21. A stringer through hole 21d, through which the stringer 20a formed on the upper face of the lower skin 20 is positioned, is formed in a central part of the lower edge of the front rib 21. Furthermore, formed on opposite front and rear sides of the lower edge of the front rib 21 with the stringer through hole 21d interposed therebetween are a pair of front and rear mounting flanges 21e and 21f that are bent toward the inside in the span direction.

A mounting portion 21g at the front end of the front rib 21 is fixed via rivets 24 to a plate-shaped mounting portion 14d that connects the web 14a and the pair of upper and lower flanges 14b and 14c of the front spar 14, and a pair of front and rear mounting portions 21h and 21i at the upper edge of the front rib 21 are fixed via rivets 25 to mounting portions 19b and 19c formed on the lower face of the upper skin 19.

Moreover, a mounting portion 21j at the rear end of the front rib 21 is fixed via rivets 26 to a plate-shaped mounting portion 13d that connects the web 13a and the pair of upper and lower flanges 13b and 13c of the main spar 13, and the pair of front and rear mounting flanges 21e and 21f at the lower edge of the front rib 21 are fixed via rivets 27 to the lower skin 20.

Furthermore, a first cutout 21k is formed between the mounting portion 21g and the mounting flange 21e, which are on the front side of the front rib 21, and a second cutout 21m is formed between the mounting portion 21j and the mounting flange 21f, which are on the rear side of the front rib 21.

Figure 4:
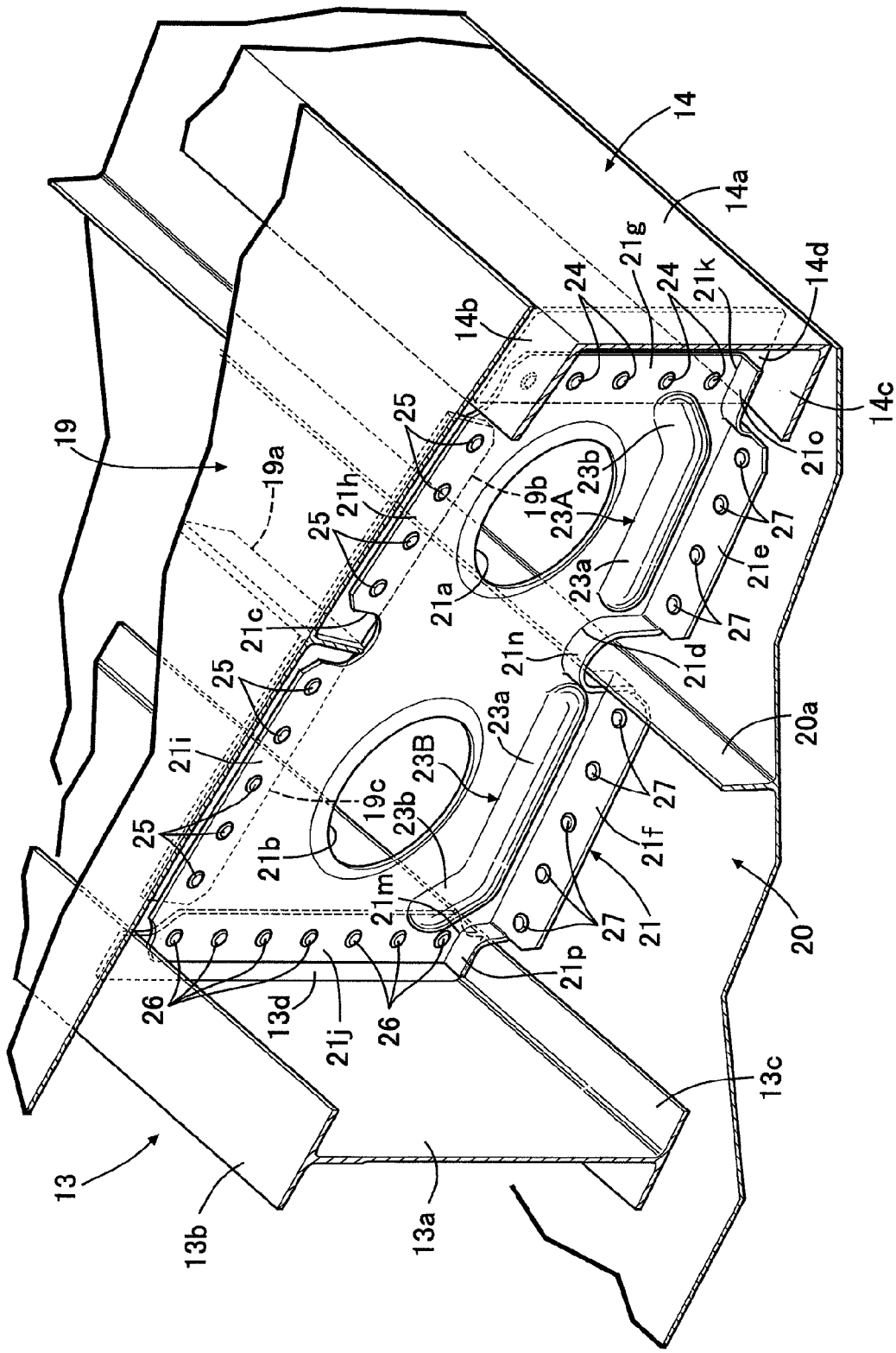
FIG. 4 is a partially cutaway perspective view of the main wing.

As is clear from FIG. 4, a reinforcing flange 21n is formed on an edge part of the stringer through hole 21d that faces the lower skin 20 by bending the edge part in the span direction, and reinforcing flanges 21o and 21p are formed on the first and second cutouts 21k and 21m respectively by bending them in the span direction. The reinforcing flange 21o of the first cutout 21k is integrally continuous with the front end of the mounting flange 21e, the reinforcing flange 21n of the stringer through hole 21d is integrally continuous with the rear end of the mounting flange 21e and the front end of the mounting flange 21f, and the reinforcing flange 21p of the second cutout 21m is integrally continuous with the rear end of the mounting flange 21f.

More specifically, the reinforcing flange 21o, the mounting flange 21e, the reinforcing flange 21n, the mounting flange 21f, and the reinforcing flange 21p are continuously connected without interruption. In addition, the height, in the span direction, of the reinforcing flange 21o, the reinforcing flange 21n, and the reinforcing flange 21p is lower than the height of the mounting flanges 21e and 21f in the span direction.

As hereinbefore described, since the reinforcing flanges 21n, 21o, and 21p, which are integrally continuous with the mounting flanges 21e and 21f, are formed on the stringer through hole 21d and the first and second cutouts 21k and 21m of the front rib 21, and the first and second reinforcing beads 23A and 23B, which are formed from the main body portions 23a and 23a that follow the mounting flanges 21e and 21f and the bent portions 23b and 23b that follow the reinforcing flanges 21o and 21p of the first and second cutouts 21k and 21m, are formed on the lower part of the front rib 21, the synergistic effects thereof greatly enhance the stiffness of the front rib 21 against a vertical load and, in particular, the stiffness of the lower part of the front rib 21, to which the lower skin 20 is joined.

In particular, since the edges on the lower side of the first and second reinforcing beads 23A and 23B are positioned in proximity to and immediately above the bend lines of the mounting flanges 21e and 21f, when a vertical load acts thereon, flexing of the front rib 21 between the first and second reinforcing beads 23A and 23B and the bend lines of the mounting flanges 21e and 21f, or flexing of the bend lines of the mounting flanges 21e and 21f, can be suppressed yet more effectively.

Figure 6A:
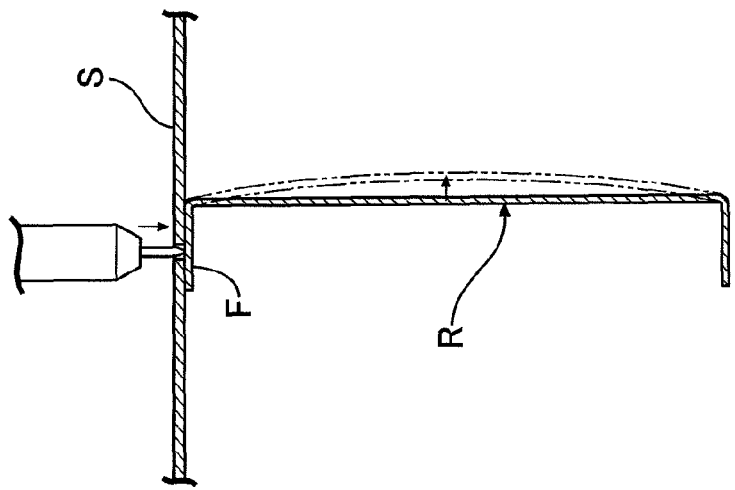
FIGS. 6A, 6B, and 6C are views showing problems of a conventional example.
Figure 6B:
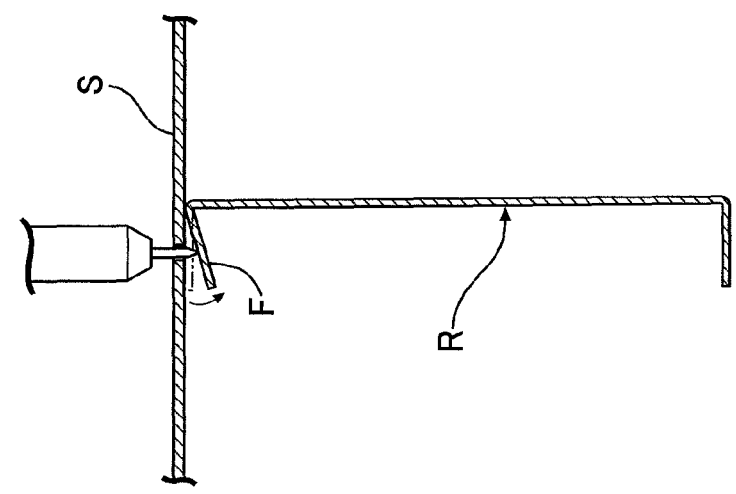
Figure 6C:
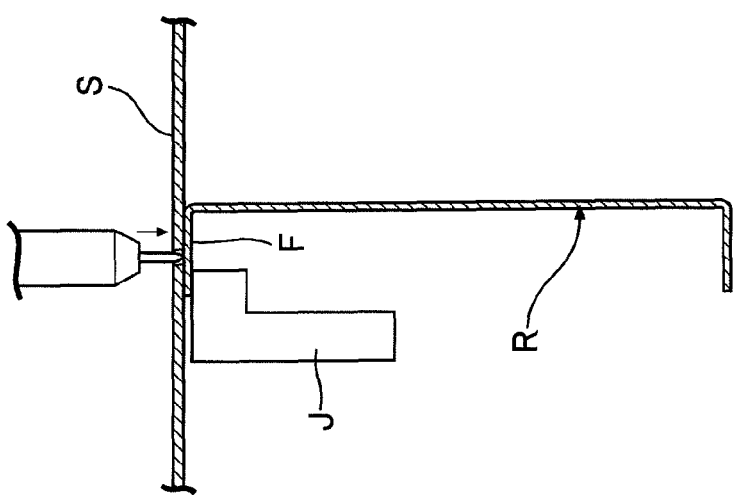

As a result, as explained by FIG. 6, when a rivet hole is drilled by superimposing the lower skin 20 on the mounting flanges 21e and 21f of the front rib 21, without using a special jig J (see FIG. 6C) that supports the mounting flanges 21e and 21f from beneath, it is possible to solve the problem of the front rib 21 flexing due to the vertical load and thereby preventing the hole from becoming a true circle, or the front rib 21 deforming and thus requiring repair, thereby improving the machining precision and reducing the machining cost.

Figure 5:
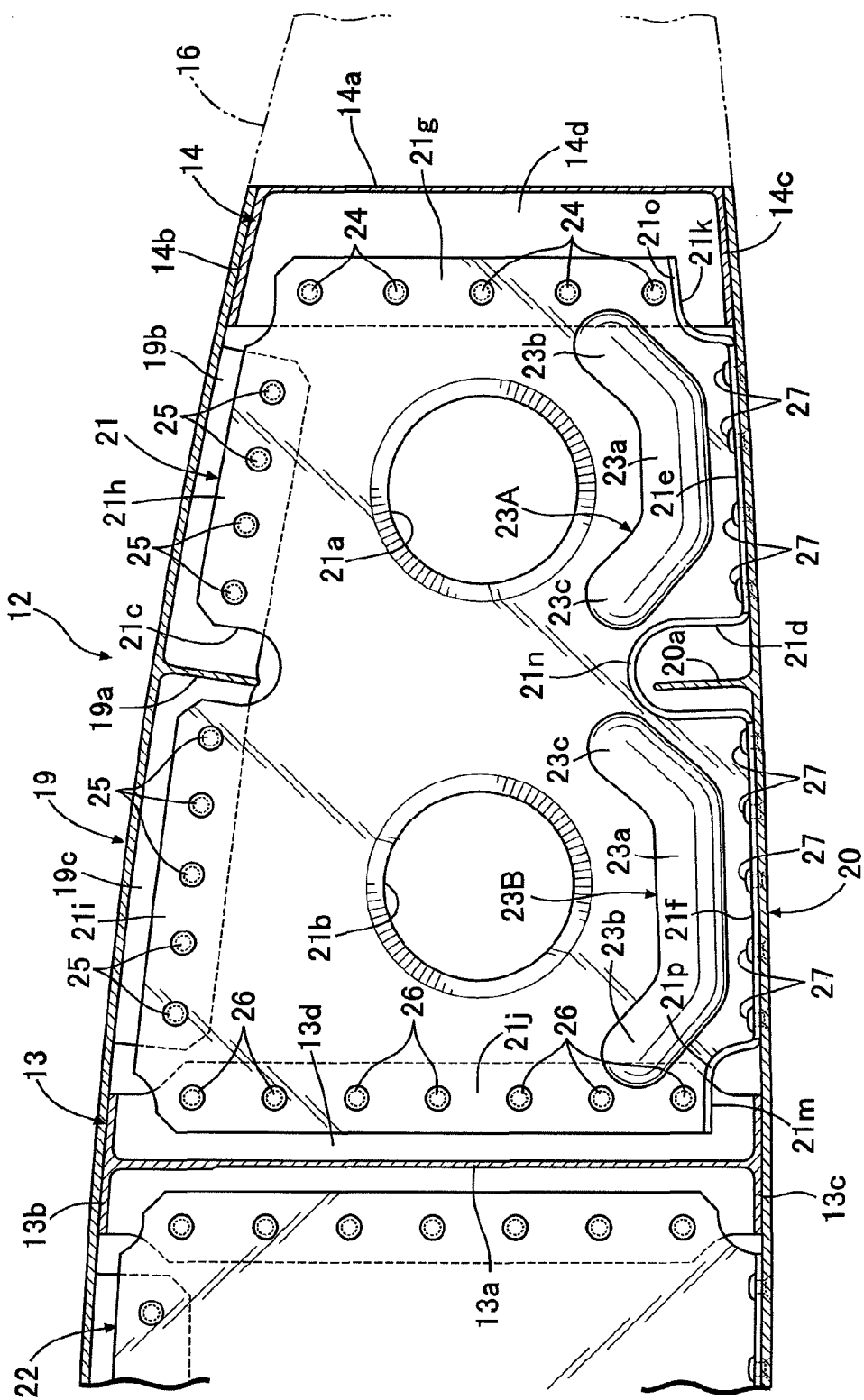
FIG. 5 is a view corresponding to FIG. 2 and related to a second embodiment.

A second embodiment of the present invention is explained now by reference to FIG. 5.

The first and second reinforcing beads 23A and 23B of the front rib 21 of the first embodiment include the bent portions 23b and 23b extending from one end of the main body portions 23a and 23a along the first and second cutouts 21k and 21m, but first and second reinforcing beads 23A and 23B of the second embodiment further include bent portions 23c and 23c extending from the other end of main body portions 23a and 23a along a stringer through hole 21d. In accordance with this second embodiment, compared with the first embodiment, the stiffness of the front rib 21 can be further enhanced.

Embodiments of the present invention are explained above, but the present invention can be modified in a variety of ways as long as the modifications do not depart from the spirit and scope thereof.

For example, in the embodiments, the front rib 21 is explained in detail, but the present invention may be applied to the rear rib 22 in the same manner. Furthermore, the rib of the present invention may be integrally continuous from a front edge part to a rear edge part without being divided.

Furthermore, in the embodiments, the part where the front rib 21 and the lower skin 20 are joined is explained, but the present invention may be applied to a part where a front rib 21 and an upper skin 21 are joined.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An airplane wing structure comprising:
first and second spars extending in a span direction;
a stringer disposed between the first and second spars and extending in the span direction;
a rib extending in a chord direction and providing a connection between the first and second spars; and
a skin covering the first and second spars, the stringer, and an upper face and a lower face of the rib;
a mounting flange being formed on at least one of an upper edge and a lower edge of the rib and being secured to the skin via a rivet, a stringer through hole being formed by cutting out the mounting flange, the stringer being positioned through the stringer through hole, and
first and second cutouts being formed in the front end and the rear end of at least one of the upper edge and the lower edge of the rib and facing parts where the first and second spars and the skin are connected,
wherein the rib comprises a reinforcing bead formed along the mounting flange, and a reinforcing flange that extends in the span direction from edges of the stringer through hole and the first and second cutouts and is integrally connected to the mounting flange.

2. The airplane wing structure according to claim 1, wherein the reinforcing bead comprises a main body portion and a bent portion that bends from an end part of the main body portion along the stringer through hole or the first or second cutout.

3. The airplane wing structure according to claim 1, wherein the reinforcing bead includes a first reinforcing portion disposed to extend from adjacent to the second spar in the cord direction towards the stringer through hole.

4. The airplane wing structure according to claim 3, wherein a proximal end of the first reinforcing portion adjacent to the second spar is bent upwardly.

5. The airplane wing structure according to claim 1, wherein the reinforcing bead includes a second reinforcing portion disposed to extend from adjacent to the first spar in the cord direction towards the stringer through hole.

6. The airplane wing structure according to claim 5, wherein a proximal end of the second reinforcing portion adjacent to the first spar is bent upwardly.

7. The airplane wing structure according to claim 3, wherein a proximal end of the first reinforcing portion adjacent to the second spar is bent upwardly and a distal end of the first reinforcing portion adjacent to the stringer through hole is bent upwardly.

8. The airplane wing structure according to claim 5, wherein a proximal end of the second reinforcing portion adjacent to the first spar is bent upwardly and a distal end of the second reinforcing portion adjacent to the stringer through hole is bent upwardly.

9. The airplane wing structure according to claim 1, wherein the mounting flange includes a front mounting flange and a rear mounting flange and the reinforcing flange includes a first reinforcing flange disposed adjacent to the front cutout, a second reinforcing flange disposed adjacent to the stringer through hole and a third reinforcing flange disposed adjacent to the second cutout, said first and second reinforcing flanges being secured to the front mounting flange and the second and third reinforcing flanges being secured to the rear mounting flange.

10. The airplane wing structure according to claim 9, wherein the front mounting flange and the rear mounting flange have a predetermined width in the span direction and the first, second and third reinforcing flanges have a predetermined width in the span direction that is less than the predetermined width of the front and rear mounting flanges.

11. An airplane wing structure comprising:
first and second spars extending in a span direction;
a stringer disposed between the first and second spars and extending in the span direction;
a rib extending in a chord direction and providing a connection between the first and second spars; and
a skin covering the first and second spars, the stringer, and an upper face and a lower face of the rib;
a mounting flange being formed on at least one of an upper edge and a lower edge of the rib and being secured to the skin, a stringer through hole being providing an aperture in the mounting flange, the stringer being positioned through the stringer through hole;
reinforcing bead formed along the mounting flange of the rib; and
a reinforcing flange extending in the span direction from edges of the stringer through hole to ends of the mounting flange, said reinforcing flange being affixed to the mounting flange.

12. The airplane wing structure according to claim 11, wherein the reinforcing bead comprises a main body portion and a bent portion that bends from an end part of the main body portion along the stringer through hole or first or second cutouts formed in the front end and the rear end of at least one of the upper edge and the lower edge of the rib and facing parts where the first and second spars and the skin are connected.

13. The airplane wing structure according to claim 11, wherein the reinforcing bead includes a first reinforcing portion disposed to extend from adjacent to the second spar in the cord direction towards the stringer through hole.

14. The airplane wing structure according to claim 13, wherein a proximal end of the first reinforcing portion adjacent to the second spar is bent upwardly.

15. The airplane wing structure according to claim 11, wherein the reinforcing bead includes a second reinforcing portion disposed to extend from adjacent to the first spar in the cord direction towards the stringer through hole.

16. The airplane wing structure according to claim 15, wherein a proximal end of the second reinforcing portion adjacent to the first spar is bent upwardly.

17. The airplane wing structure according to claim 13, wherein a proximal end of the first reinforcing portion adjacent to the second spar is bent upwardly and a distal end of the first reinforcing portion adjacent to the stringer through hole is bent upwardly.

18. The airplane wing structure according to claim 15, wherein a proximal end of the second reinforcing portion adjacent to the first spar is bent upwardly and a distal end of the second reinforcing portion adjacent to the stringer through hole is bent upwardly.

19. The airplane wing structure according to claim 12, wherein the mounting flange includes a front mounting flange and a rear mounting flange and the reinforcing flange includes a first reinforcing flange disposed adjacent to the front cutout, a second reinforcing flange disposed adjacent to the stringer through hole and a third reinforcing flange disposed adjacent to the second cutout, said first and second reinforcing flanges being secured to the front mounting flange and the second and third reinforcing flanges being secured to the rear mounting flange.

20. The airplane wing structure according to claim 19, wherein the front mounting flange and the rear mounting flange have a predetermined width in the span direction and the first, second and third reinforcing flanges have a predetermined width in the span direction that is less than the predetermined width of the front and rear mounting flanges.

* * * * *